Dec. 2, 1941.    C. F. ZUKOSKI    2,264,821

AUTOMOBILE COOLING SYSTEM

Filed May 6, 1940    2 Sheets-Sheet 1

INVENTOR;
CHARLES F. ZUKOSKI
BY
ATTORNEY

Dec. 2, 1941.   C. F. ZUKOSKI   2,264,821
AUTOMOBILE COOLING SYSTEM
Filed May 6, 1940   2 Sheets-Sheet 2

INVENTOR;
CHARLES F. ZUKOSKI
BY
ATTORNEY

Patented Dec. 2, 1941

2,264,821

UNITED STATES PATENT OFFICE 2,264,821

AUTOMOBILE COOLING SYSTEM

Charles F. Zukoski, St. Louis, Mo.

Application May 6, 1940, Serial No. 333,542

6 Claims. (Cl. 62—115)

My invention relates to automobiles and more particularly to the combination in an automobile of a cooling system whereby in hot weather the tonneau of the car may be maintained at moderate temperatures so that the passengers riding in the car may be comfortable. It should be understood that in this specification the term automobile includes all self-propelled vehicles and trailers or any other adjuncts thereto for highway use.

In the past many attempts have been made to cool automobiles by mechanical means, but such devices as have been provided, were expensive to manufacture and ineffectual and inefficient in operation. The principal disadvantages of the devices as used heretofore were encountered in operatively connecting the refrigerant compressor to the motor or the drive shaft of the automobile. In most instances the compressor usually was driven directly from the motor and, as the speed of the motor fluctuated, the speed of the compressor varied also in direct relation with the motor speed. Since a compressor of the kind used for condensing refrigerant in a refrigerating system has a substantially narrow range of efficient operating speeds, this wide variation of motor speeds made it impossible to operate the compressor efficiently directly from the motor. If the compressor was geared to the motor so that it would operate efficiently when the car was traveling, say at a speed of thirty miles per hour, then when the car traveled at a speed of sixty miles per hour, the speed of the compressor was much too high and frequently the compressor overheated, was damaged thereby and needed costly repairs. If the compressor was geared to the motor so that it operated efficiently at a car speed of sixty miles per hour, then when the car traveled at substantially lower speeds, as in city driving, the speed of the compressor was so low that the tonneau of the car was not cooled adequately by the cooling system.

Also in cooling systems as used on automobiles heretofore, the condensing coil frequently was positioned adjacent the motor so that heat from the motor heated the condensing coil, thus resulting in inefficient operation of the cooling system.

In order to overcome the deficiencies of cooling systems for automobiles as used heretofore, my invention contemplates a cooling system comprising a refrigerant compressor adapted to be driven by the motor of the automobile. A power transmitting mechanism operatively connects the compressor to the motor and a control is provided to actuate the power transmitting mechanism. The power transmitting mechanism and the control are adapted and arranged whereby when the motor operates at a predetermined speed the control may be operated either manually or automatically to cause the power transmitting mechanism to drive the compressor so that the speed ratio between the motor and the compressor, when the motor operates at speeds lower than the predetermined speed, will be different than the speed ratio between the motor and the compressor when the motor operates faster than the predetermined speed.

Connected in series with the compressor is a cooling coil and a refrigerant condensing coil. The cooling coil is positioned in the tonneau of the automobile whereby the tonneau is maintained at a moderately low temperature, and the refrigerant condensing coil is isolated thermally from the motor and preferably is mounted adjacent the radiator and forwardly thereof so that cool air passes thereover before being heated by the motor.

Having thus briefly described my invention, one object thereof is to provide a cooling system for automobiles which will efficiently maintain the tonneau of the automobile at a moderate temperature.

Another object of my invention is to provide a cooling system for automobiles which is cheap in cost, efficient in operation and compact in design.

A more specific object of my invention is to provide a cooling system for automobiles which may be driven by the motor of the automobile and will operate efficiently at all motor speeds.

Other objects and advantages will be apparent to those skilled in the art from the following description wherein reference is made to the drawings illustrating a preferred embodiment of my invention and wherein like reference numerals designate like parts throughout the several views.

Figure 1:
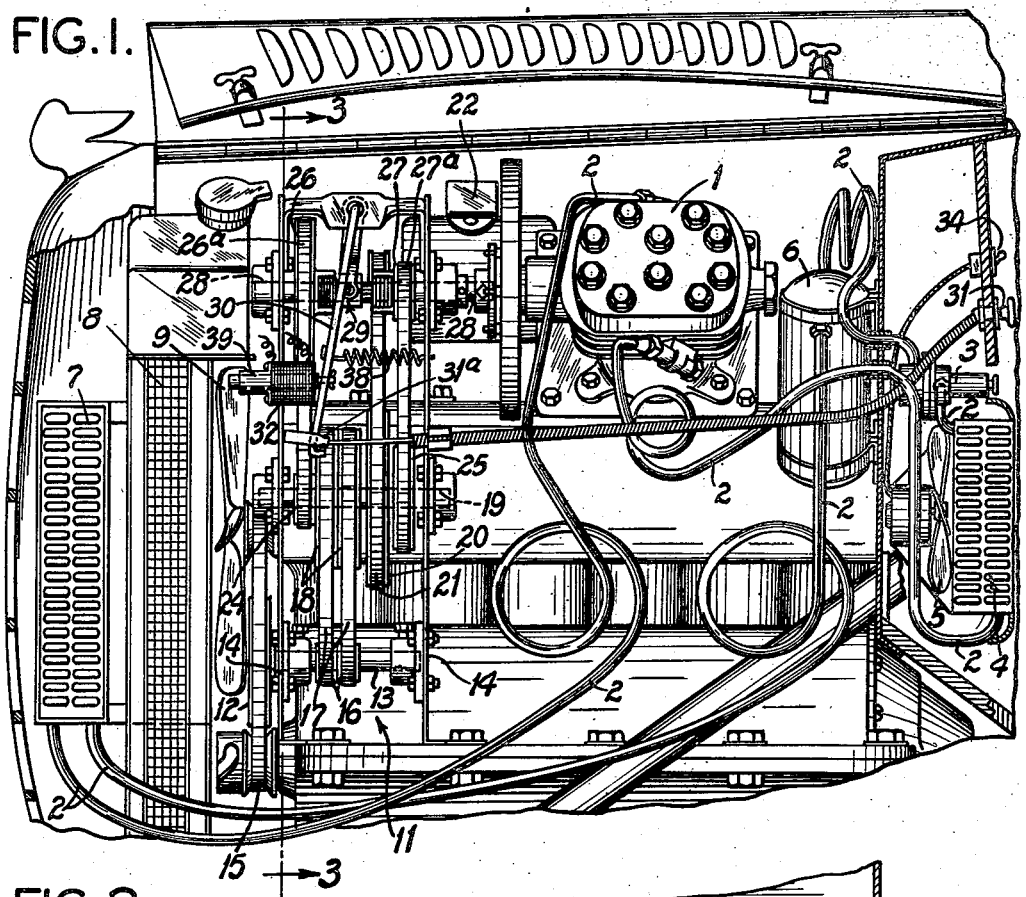
Fig. 1 shows a cooling system operated by the motor of an automobile according to the teachings of my invention.
Figure 2:
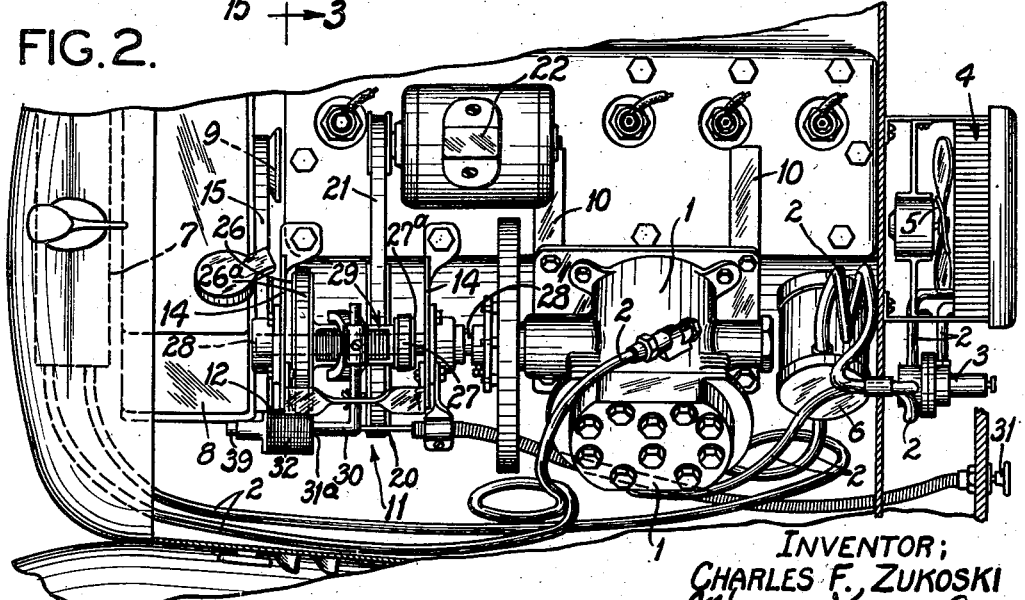
Fig. 2 is a plan view of the automobile motor and cooling system.

Referring to the figures, an automobile is shown therein provided with a cooling system constructed according to my invention and including a compressor 1 connected at the suction side thereof to a cooling coil 4 located in the tonneau of the automobile and adapted to cool and maintain the tonneau at a moderate temperature. A fan 5 is provided mounted behind the cooling coil 4 to circulate air through the coil and the tonneau to increase the efficiency of the cooling system. Connected to the cooling coil 4 and in series with the compressor 1 is an expansion valve 3 also connected to a reservoir 6 arranged so that the supply of refrigerant in the cooling system may be stored and be replenished from time to time. Connected at one end to the reservoir 6 and at the other end to the compressor 1 at the pressure side thereof and in series with the other elements of the cooling system is a refrigerant condensing coil 7 positioned forwardly of the radiator 8 of the automobile so that the fan 9 on the motor of the automobile and forward motion of the car causes a flow of air therethrough. It will be observed that air flows through the refrigerant condensing coil 7 before contacting the heated parts of the automobile.

The compressor 1, and its power transmitting mechanism, as explained below, are mounted on the motor to move therewith, but the expansion valve 3, the cooling coil 4 and the refrigerant condensing coil 7, in this embodiment, are carried by other parts of the automobile and, therefore, are connected in series in the manner described above by suitable tubing 2 which, preferably, is coiled as shown clearly in Fig. 1 so that the tubing will not break due to motor vibration.

The compressor 1 may be supported on the automobile motor by a triangular bracket 10 held rigidly to the motor head by the motor head bolts. The compressor 1 is operatively connected to the motor by means of a power transmitting mechanism 11 which is adapted and arranged to drive the compressor at various speeds relative to the motor depending on the speed of the motor and, in this way, the compressor 1 may be operated within an efficient speed range for any motor speed.

Figure 3:
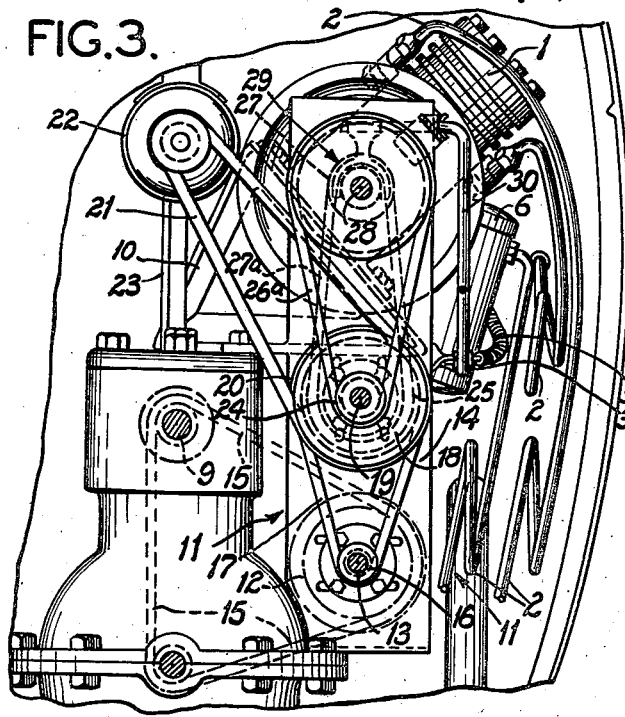
Fig. 3 is a section taken on line 3—3 of Fig. 1.

The power transmitting mechanism 11 comprises a driving pulley 12 mounted on a shaft 13 rotatably carried by a frame 14 supported by the car motor. The pulley 12 is operatively connected to the crank shaft of the motor by an endless belt 15 which rotates the pulley 12 and the shaft 13. Rigidly mounted on the shaft 13 is a pair of pulleys 16 provided with endless belts 17 which drive a pair of pulleys 18 rigidly mounted on a shaft 19 rotatably carried by the frame 14. Also mounted on the shaft 19 is a pulley 20 operatively connected by a belt 21 to the car generator 22 which preferably is mounted on a suitable bracket 23 fastened to the motor head. Also mounted on the shaft 19 are pulleys 24 and 25 of different sizes operatively connected by belts 26ᵃ and 27ᵃ to pulleys 26 and 27, respectively, carried by a shaft 28 supported rotatably on the frame 14 and adapted to drive the compressor 1. The pulleys 26 and 27 are arranged so that the shaft 28 may be operated selectively at various speeds by means of a clutch mechanism 29 of any suitable kind which is operated by a lever 30 carried by the frame 14. As an illustration of a suitable clutch mechanism I have shown a shiftable clutch member at 29 in Fig. 1, located between and adapted to engage clutch members on the pulleys 26 and 27, respectively. When said shiftable clutch member at 29 in Fig. 1 engages the clutch member on the large pulley 26, power is transmitted from said large pulley to the shaft 28. However, when said shiftable clutch member engages the clutch member on the smaller pulley 27, the power is transmitted from said pulley 27 to the compressor shaft 28. The lever 30 is employed to move said shiftable clutch member into and out of engagement with said clutch members on the pulleys 26 and 27. The frame 14 preferably is slotted, as shown in Fig. 3, to permit the shafts and pulleys comprising the power transmitting mechanism to be adjusted relative to each other so that the endless belts are maintained in proper tension over the pulleys.

Figure 5:
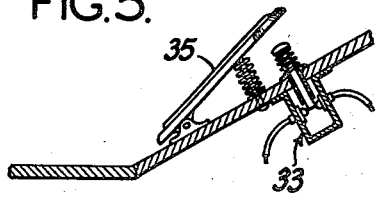
Figure 6:
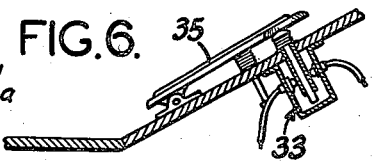
Figure 4:
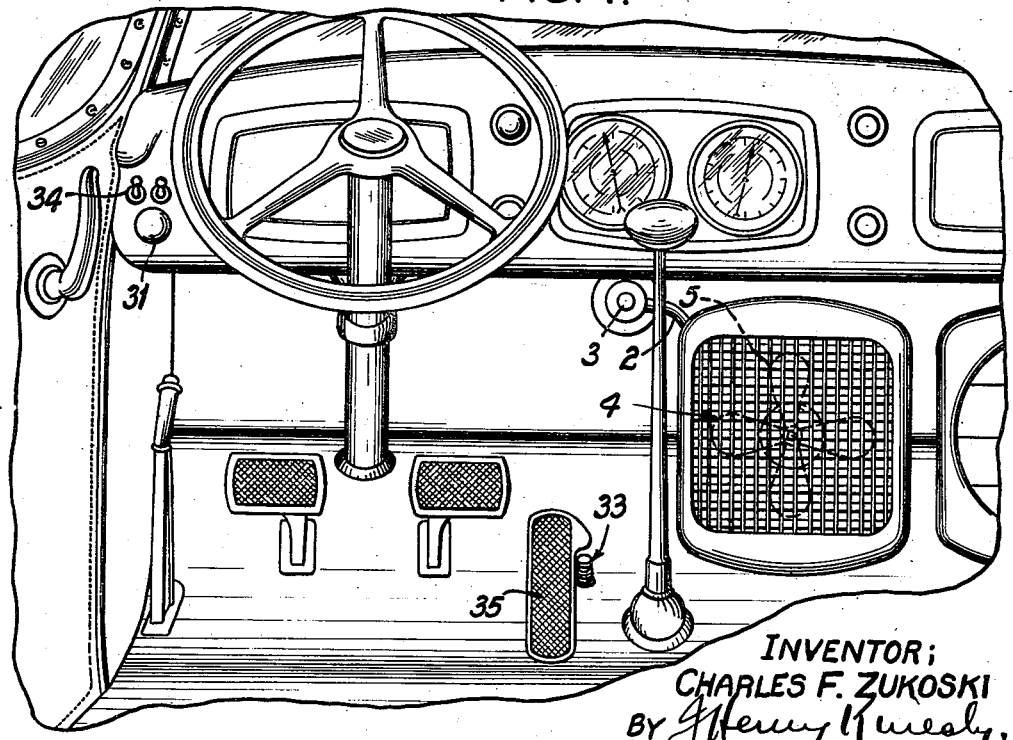
Fig. 4 shows the front portion of the automobile tonneau showing the arrangement therein of the cooling system and controls therefor, and, Figs. 5 and 6 show details of an automatic control switch for operating the power transmitting mechanism.

In the embodiment shown, the clutch mechanism 29 may be operated either manually or automatically. For manual operation of the clutch mechanism 29 a pull lever 31 is provided on the dash of the automobile, and the lever has at the end thereof remote from the dash a forked member 31ᵃ adapted to engage the clutch lever 30. This forked member 31ᵃ is elongated, as shown in Fig. 1, and the lever 30 extends between the legs of said forked member, as shown in Fig. 3. I will hereafter more specifically describe a tension spring 38 (Fig. 1) which tends to retain said extension of the lever 30 in the forked member 31ᵃ. However, when this forked member is moved to an extreme position to the right of the position shown in Fig. 1, the lever 30 can be moved independently of said forked member. The clutch mechanism 29 can then be operated automaticaly by means of a solenoid 32 connected electrically in series with a switch 33, shown clearly in Figs. 5 and 6, operated by the accelerator 35 of the automobile when the accelerator passes below a predetermined point. When the switch 33 is closed current flows through the solenoid 32 and draws thereinto a core 39 connected with the clutch lever 30 whereby the low speed driving mechanism including the pulleys 24 and 26 and belt 26ᵃ operates the shaft 28 and the compressor 1. The switch 33 is arranged so that, when the accelerator 35 is depressed below the predetermined point, the circuit including the solenoid 32 is closed and current flows through the solenoid until the accelerator is raised again beyond the predetermined point when the circuit is broken, all as shown in Figs. 5 and 6. To operate the lever 30 so that the shaft 28 and compressor 1 are driven by the high speed driving mechanism including the pulleys 25 and 27 and belt 27ᵃ when the accelerator is raised above the predetermined point and current ceases to flow through the solenoid 32, a tension spring 38 is provided having one end thereof attached to the frame 14 and the other end thereof attached to the clutch lever 30. Also connected in series with the switch 33 and solenoid 32 is a master switch 34 adapted to break the circuit so that the automatic feature of the control for the power transmitting mechanism is ineffective and to be used, as for instance, when the weather is cool and the cooling system is unnecessary. Also, in some instances it may be desirable, particularly when driving at high speed for a considerable distance, to operate the control manually by the pull lever 31 on the dash and then the master switch may be opened so that the automatic control is inoperative.

The operation of a cooling system constructed according to my invention should be understood clearly from the above description. When it is desired to cool the tonneau of the car and to control the power transmitting mechanism manually, the pull lever 31 is pulled away from the dash to bring into operative engagement with the shaft 28 and compressor 1 the high speed driving mechanism, including the pulleys 25 and 27 and the belt 27a, to be used when the car motor is operating at low speed. When the motor operates at high speed the lever 31 is moved towards the dash whereby the low speed driving mechanism including the pulleys 24 and 26 and belt 26a, operates the shaft 28 and the compressor 1. When the compressor 1 is operated condensed refrigerant is supplied to the cooling coil 4 in the tonneau of the automobile where it evaporates and absorbs heat from the air in contact therewith, and the fan 5 circulates a large volume of air over the cooling coil so that the tonneau may be cooled quickly. When the tonneau has been cooled sufficiently the cooling system may be rendered inoperative by operating the pull lever 31 so that the lever is positioned substantially midway between the high and low speed positions whereby the power transmitting mechanism is in neutral position, and neither the pulley 26 nor the pulley 27 is operatively connected with the shaft 28 and compressor 1.

When it is desired to utilize the automatic control for the power transmitting mechanism the lever 31 is pulled away from the dash so that the high speed driving mechanism may rotate the shaft 28. The master switch 34 is closed and, when the accelerator 35 is operated and passes below a predetermined point, the switch 33 is closed and current flows through the circuit including the solenoid 32 which sets up a magnetic field and moves the core 39 and lever 30 to actuate the clutch mechanism 29 so that the low speed driving mechanism is brought into operative engagement with the shaft 28. The accelerator is usually depressed to increase the speed of the motor, and it will be understood that this movement of the accelerator will close the switch 33 to decrease the speed ratio between the motor and the compressor. When the accelerator 35 is released and passes above a predetermined point, the switch 33 is opened and current ceases to flow through the solenoid 32, whereby the spring 38 moves the clutch lever 30 so that the high speed driving mechanism is brought into operative engagement with the shaft 28. When the tonneau of the car has been cooled sufficiently and the cooling system no longer is needed, the compressor 1 is rendered inoperative by opening the master switch 34 and by moving the pull lever 31 so that the power transmitting mechanism is in neutral position.

Other arrangements may be used without deviating from the scope of my invention and while I have described a particular embodiment thereof, it is to be understood that I do not limit myself to the form and arrangement shown and described. For instance, while I have shown one means for automatically controlling the power transmitting mechanism, other arrangements also may be used, such as centrifugal friction clutches, suction controls operating from the intake manifold of the motor and similar speed control mechanisms.

Also, a power transmitting mechanism may be utilized which has three or more speed ratios and which may be brought into operative engagement with the compressor shaft to operate the compressor at various speeds relative to the motor. A power transmitting mechanism of this kind is adapted particularly for use with powerful motors which may be operated at extremely high speeds.

It should be understood, also, that the arrangements of the various parts comprising the cooling system may be mounted on the automobile in any convenient manner depending principally on the make of car and location of the various parts.

What I claim as new and desire to secure by Letters Patent is:

1. In combination in an automobile a refrigerant compressor adapted to be driven by the motor of said automobile, a power transmitting mechanism connected to the crank shaft of said motor, said power transmitting mechanism comprising a series of pulleys connected by endless belts and arranged to operatively connect said motor and said compressor so that said compressor may be operated at various speed ratios relative to said motor, an automatic control for said power transmitting mechanism including a solenoid and a clutch mechanism, said solenoid being adapted and arranged whereby when the accelerator of said automobile is depressed beyond a predetermined point current flows through said solenoid and causes said clutch mechanism to operate said power transmitting mechanism to drive said compressor at a predetermined speed ratio with relation to the motor.

2. In combination in an automobile a refrigerant compressor adapted to be driven by the motor of said automobile, a power transmitting mechanism connected to the crank shaft of said automobile, and operatively connecting said compressor to said motor, said power transmitting mechanism comprising a series of pulleys connected by endless belts and arranged to operatively connect said motor and said compressor so that said compressor may be operated at various speed ratios relative to said motor, an automatic control for said power transmitting mechanism including a solenoid and a clutch mechanism, said solenoid being adapted and arranged whereby when the accelerator of said automobile is depressed beyond a predetermined point current flows through said solenoid and causes said clutch mechanism to operate said power transmitting mechanism to drive said compressor at a predetermined speed ratio with relation to the motor, and a spring adapted and arranged to operate said clutch mechanism when said accelerator is raised above said predetermined point and current ceases to flow through said solenoid to change the speed ratio between said motor and said compressor.

3. In a system for cooling the interior of an automobile provided with a motor and an accelerator for controlling the speed of the motor, a refrigerant compressor adapted to be driven by the motor of said automobile, a variable speed device operatively connecting the compressor to said motor, and automatic control means for actuating said variable speed device in accordance with different positions of the accelerator so that the speed ratio between the motor and compressor is decreased as the accelerator is actuated to increase the speed of the motor.

4. In a system for cooling the interior of an automobile provided with a motor and an accelerator for controlling the speed of the motor, a refrigerant compressor adapted to be driven by the motor of said automobile, a variable speed device operatively connecting the compressor to said motor, and automatic control means for actuating said variable speed device in accordance with different positions of the accelerator so that the speed ratio between the motor and compressor is decreased as the accelerator is actuated to increase the speed of the motor, said control means comprising a solenoid for actuating said variable speed device and a switch electrically connected in series with said solenoid, said switch being operated by the accelerator of the automobile when said accelerator passes a predetermined point.

5. In a system for cooling the interior of an automobile provided with a motor and an accelerator for controlling the speed of the motor, a refrigerant compressor adapted to be driven by the motor of said automobile, a variable speed device operatively connecting the compressor to said motor, said variable speed device comprising a pair of clutch devices and a clutch operating member movable to selective clutch operating positions to vary the speed ratio between the motor and compressor, and automatic control means for actuating said clutch operating member, said automatic means including a solenoid for moving the clutch operating member in one direction to actuate one of said clutch devices, a switch electrically connected in series with said solenoid, said switch being operated by the accelerator of the automobile when said accelerator passes a predetermined point, and a spring for moving the clutch operating member in another direction to actuate the other clutch device.

6. In a sytsem for cooling the interior of an automobile provided with a motor and an accelerator for controlling the speed of the motor, a refrigerant compressor adapted to be driven by the motor of said automobile, a variable speed device operatively connecting the compressor to said motor, automatic control means for actuating said variable speed device in accordance with different positions of the accelerator so that the speed ratio between the motor and compressor is decreased as the accelerator is actuated to increase the speed of the motor, and a manually operated control device for actuating said variable speed device to provide for manual control of the speed of the compressor independently of the accelerator control means.

CHARLES F. ZUKOSKI.